United States Patent Office 3,772,285
Patented Nov. 13, 1973

3,772,285
PROCESS OF PREPARING AROMATIC SULFONIC ACID SALTS OF HEXAMETHYLENETETRAMINE
Charles F. Winans and James A. Cardina, Akron, Ohio, assignors to The Goodyear Tire & Rubber Company, Akron, Ohio
No Drawing. Filed Jan. 26, 1972, Ser. No. 221,054
Int. Cl. C07d 55/52
U.S. Cl. 260—248.5         12 Claims

ABSTRACT OF THE DISCLOSURE

Process of preparing certain aromatic monosulfonic acid salts of hexamethylenetetramine by sulfonating a monocyclic aromatic hydrocarbon to form a solution of the aromatic monosulfonic acid in the aromatic hydrocarbon, combining this solution with a suspension of hexamethylenetetramine in the aromatic hydrocarbon to form the aromatic monosulfonic acid salt of hexamethylenetetramine as a suspended solid product, removing the solid product, and returning the recovered aromatic hydrocarbon for a subsequent preparation.

---

This invention relates to a method of preparing salts of hexamethylenetetramine, more particularly salts of hexamethylenetetramine with aromatic monosulfonic acids.

The use of resins prepared in situ from hexamethylenetetramine (a methylene donor) and resorcinol (a methylene acceptor) in rubber compounding to assist in the adhesion of the tire reinforcing cords to the carcass rubber compound of the tire is well known in the art. The use of hexamethylenetetramine as an accelerator in the sulfur vulcanization of rubber is also well known.

The aromatic monosulfonic acid salts of hexamethylenetetramine may also be used to produce in situ resins or to accelerate vulcanization, just as the hexamethylenetetramine itself.

Hexamethylenetetramine salts of aromatic monosulfonic acids can be prepared by reactions between aromatic monosulfonic acids and hexamethylenetetramine in water or in isopropyl alcohol. In both of these methods the aromatic monosulfonic acid must be separately produced, dissolved in the water or isopropyl alcohol, and combined with solutions of hexamethylenetetramine in water or isopropyl alcohol respectively.

It is desirable to produce these aromatic monosulfonic acid salts of hexamethylenetetramine by a practical and economic process.

It is an object of this invention to provide a process for producing aromatic monosulfonic acid salts of hexamethylenetetramine. Other objects will be apparent from the subsequent discussion.

The objects of this invention are accomplished by (1) sulfonating at least one monocyclic aromatic hydrocarbon selected from the group consisting of toluene, ortho xylene, meta xylene, and para xylene, to form a solution of the aromatic monosulfonic acid in the aromatic hydrocarbon and (2) combining this solution with the hexamethylenetetramine to form the aromatic monosulfonic acid salt of hexamethylenetetramine. Preferably the hexamethylenetetramine is added in the form of a suspension in the aromatic hydrocarbon. The aromatic monosulfonic acid salt of hexamethylenetetramine can then be separated from the aromatic hydrocarbon. The recovered aromatic hydrocarbon can be returned as charge stock for a subsequent sulfonation.

The aromatic monosulfonic acids produced in the first steps of this process are:

toluene-2-sulfonic acid,
toluene-4-sulfonic acid,
1,2-xylene-3-sulfonic acid,
1,2-xylene-4-sulfonic acid,
1,3-xylene-2-sulfonic acid,
1,3-xylene-4-sulfonic acid, and
1,4-xylene-2-sulfonic acid.

The sulfonic acids from toluene and from the xylenes are readily prepared and are soluble in the excess aromatic hydrocarbon.

In the second step of the process, the hexamethylenetetramine salts of the above named aromatic monosulfonic acids are physically combined in the ratio of from one mole up to 1.5 moles and more of hexamethylenetetramine per one mole of sulfonic acid. These salts are substantially insoluble in the aromatic hydrocarbon reaction medium.

The hexamethylenetetramine salts of the aromatic monosulfonic acids are easily separated from the aromatic hydrocarbon reaction medium. The separation, for example, can be accomplished by centrifuging or filtering. The manner in which the separation is accomplished is not critical to the practice of this invention. After centrifuging or filtering it is only necessary to remove the adhering aromatic hydrocarbon by evaporation to leave a dry, free-flowing crystalline salt.

The aromatic hydrocarbon recovered is neutral, clean, dry, and perfectly suitable for returning to a subsequent sulfonation reaction, step, or for other purposes.

As mentioned earlier herein, methods other than the present method can be used. They involve the use of water or isopropyl alcohol.

When water is the solvent, the product consists of an aqueous solution from which the desired salt is recovered by evaporation of the solvent, with the attendant danger of hydrolyzing at least some of the hexamethylenetetramine.

When isopropyl alcohol is the solvent, the desired product although insoluble to a great extent in the isopropyl alcohol, is not completely insoluble. Therefore problems occur in recovery of the isopropyl alcohol for recycle to the process, since some of the product remains dissolved in the solvent.

The method of this invention avoids the difficulties which are inherent in other methods of producing the aromatic monosulfonic acid salts of hexamethylenetetramine.

Sulfonation of xylenes and toluenes with sulfuric acid is a well known process. (See a review in Groggins, Unit Processes in Organic Synthesis, 4th ed., McGraw-Hill, New York, 1952, and the references described therein). Catalysts need not be used in the present sulfonation step. The molar ratio of the toluene or xylene hydrocarbon to the sulfuric acid can vary widely. The molar ratio preferably should be chosen to permit some of the hydrocarbon to remain unreacted and act as a solvent for the sulfonic acid. A convenient molar ratio of a hydrocarbon to the sulfuric acid is 4:1. Higher molar ratios, e.g., 10:1 and above, and lower molar ratios can be used. However, a molar ratio of 2:1 and especially 1.5:1 and lower can lead to undesirable higher reaction temperatures, higher sulfonic acid concentrations and potentially larger amounts of the undesirable sulfone. The sulfuric acid should be essentially completely reacted with the hydrocarbon before combining the solution of the sulfonic acid with the suspension of the hexamethylenetetramine (HMTA), since excess sulfuric acid tends to react with the hexamethylenetetramine to form an undesired sulfate salt. A preferred sulfonation temperature is 90° C. to 160° C. Reaction temperature should normally be no greater than the boiling point of the aromatic hydrocarbon. The water formed during the sulfonation reaction is preferably continuously removed in order to drive the reaction to completion.

In the sulfonation of toluene by the method of this invention, toluene-4-sulfonic acid is produced predominantly over toluene-2-sulfonic acid and the rate of formation is relatively fast.

The xylenes sulfonate most rapidly of all. Meta xylene sulfonates much faster than does toluene and produces principally 1,3-xylene-4-sulfonic acid. Para xylene sulfonates faster than toluene and produces one sulfonation product, 1,3-xylene-2-sulfonic acid. Ortho xylene also sulfonates faster than toluene and produces principally 1,2-xylene-4-sulfonic acid.

The ratio of the various monosulfonic acids from xylene will depend on the ratios of the isomers in the commercial xylene source, but this is not a critical matter. All of the toluene sulfonic acids and all of the xylene monosulfonic acids in whatever ratios they are present are suitable for conversion to the hexamethylenetetramine salts.

Naturally, in the sulfonation step where an excess of xylene is used, the meta xylene will react preferentially because of its greater reaction rate. As a consequence the xylene mixture recovered from the process and recycled to a subsequent sulfonation step will be relatively depleted in meta xylene.

The sulfonation of toluene is readily accomplished at atmospheric pressure with commercial 96 percent sulfuric acid at the reflux temperature of 110° C. Higher temperatures may be applied as well, and indeed sulfonation proceeds more rapidly, but more by-products are formed. Sulfonation of toluene may be accomplished at lower temperature, for instance under vacuum, or by adding an auxiliary entrainer such as hexane, but the time of reaction is increased and the proportion of toluene-4-sulfonic acid is reduced.

Xylenes sulfonate very rapidly and completely at the atmospheric pressure reflux temperature of about 140° C. and the reaction is still very fast at 100° C., which can be obtained by adding a low boiling inert entrainer such as hexane, or by operating at a suitably reduced pressure.

With both toluene and the mixed xylenes, the use of undiluted commercial materials is preferred. It is of course also possible to use other monocyclic aromatic hydrocarbons as starting material for sulfonation. Among these are, for example, ethyl benzene, diethyl benzene, mesitylene, isopropyl benzene, di-isopropyl benzene and the like, all of which are readily sulfonated under the reaction conditions of this invention. However, lower manufacturing costs are obtained when using the lower priced commercial materials such as toluene and mixed xylenes.

The hexamethylenetetramine can be added directly to the sulfonic acid solution as a dry solid. However, it is preferably combined with the sulfonic acid solution as a suspension in the hydrocarbon used in the sulfonic acid solution. The hexamethylenetetramine (HMTA) is therefore normally suspended in the aromatic hydrocarbon by any conventional method. The concentration of the suspension is not critical. A level of from 30 parts to 70 parts by weight of HMTA per 100 parts by weight of aromatic hydrocarbon is representative and a level of 40 to 50 parts even more representative.

The aromatic sulfonic acid and HMTA can be reacted in either a batchwise or continuous fashion. The reaction temperature is normally 0 to 60° C., although a temperature of 25° C. to 50° C. is preferred. No catalyst for the reaction is necessary. The molar ratio of the hexamethylenetetramine to the organic aromatic sulfonic acid is always at least about 1:1 and can be as high as 1.5:1 and above. However, the higher amounts are unnecessary and can result in a salt containing unreacted HMTA. Preferably only a slight excess of hexamethylenetetramine (i.e., greater than a 1:1 molar ratio) is used. A preferred molar range of the amine to the acid is from 1:1 to 1.2:1, more preferably 1:1 to 1.1:1 and most preferably 1:1 to 1.05:1.

The salts which can be prepared by the above-identified process are illustrated by the following:

Hexamethylenetetrammonium ortho-toluenesulfonate,
Hexamethylenetetrammonium meta-toluenesulfonate,
Hexamethylenetetrammonium para-toluenesulfonate,
Hexamethylenetetrammonium 2,3-dimethylbenzenesulfonate,
Hexamethylenetetrammonium 2,4-dimethylbenzenesulfonate,
Hexamethylenetetrammonium 2,5-dimethylbenzenesulfonate,
Hexamethylenetetrammonium 2,6-dimethylbenzenesulfonate,
Hexamethylenetetrammonium 3,4-dimethylbenzenesulfonate, and
Hexamethylenetetrammonium 3,5-dimethylbenzenesulfonate, They may be represented by the following structural formula:

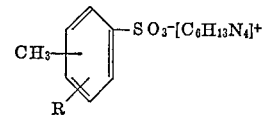

wherein R is selected from the group consisting of hydrogen and methyl.

The following examples are intended to illustrate but not to limit the scope of this invention. Unless indicated otherwise, all parts are parts by weight.

EXAMPLE 1

One hundred and two parts of 96 percent sulfuric acid were charged to a glass reactor with 400 parts toluene. With continuous stirring the reaction mixture was heated to the atmospheric pressure boiling point of toluene at 110° C. and maintained at that temperature with vigorous toluene reflux. The reflux passed through a trap to remove separated water before being returned to the reactor. After 4½ hours the separation of water had practically ceased at 95 percent of the theoretical amount, and the reaction product in the reactor was a homogeneous slightly darkened solution. This solution was analyzed with the following results on a toluene-free basis:

|  | Percent |
|---|---|
| Acidity as toluene sulfonic acid | 96.1 |
| Toluene-4-sulfonic acid content | 96.0 |
| Di-tolyl sulfone | 1.9 |
| Sulfuric acid | 0.6 |
| Water | 1.4 |

The above toluene solution containing 165.2 parts of toluene-4-sulfonic acid was cooled to room temperature and added with stirring and cooling to a toluene suspension of 140 parts hexamethylenetetramine in 300 parts of toluene. This step was conducted at such a rate and with external cooling so that the temperature did not rise above 50° C. Finally with external cooling, the temperature was again reduced to 25° C.

The resulting white crystalline suspension of the toluene-4-sulfonic acid salt of hexamethylenetetramine was filtered out, and the adhering toluene was allowed to evaporate to give 304 parts of the desired product, which represented an overall 97.5 percent yield. The melting point was 155–160° C.

The toluene filtrate from the above example was clear and transparent, and was used in the following high temperature example.

EXAMPLE 2

One hundred and two parts of 96 percent sulfuric acid and 100 parts toluene filtrate from Example 1 were charged into a glass reactor and heated under reflux at atmospheric pressure at 110° C. for one hour. Then 20 parts of glacial acetic acid was added to repress sulfone formation, and the temperature was raised to 140–160° C. by removal of toluene. Then toluene was very slowly added to remove water of reaction azeotropically while not depressing the temperature below 140° C. Water removal was essentially complete in 2.5 hours. Analysis of this product showed 1.5 percent sulfone and again 96 percent of toluene sulfonic acid on a toluene-free basis. This product was cooled and diluted to 33 percent concentration, and slowly added to a suspension of 140 parts of hexamethylenetetramine in 300 parts toluene with cooling and stirring. After filtering and evaporation of adhering toluene, 302 parts of white crystalline product was obtained.

There was, however, an odor of acetic acid from the product, and the recovered recycle toluene also contained some acetic acid, which, however, would not be objectionable in the re-use of the toluene in this process.

However, operation at the elevated temperature of 140–160° C. was awkward and conferred no advantages over the simpler procedure of Example 1.

EXAMPLE 3

One hundred and two parts of 96 percent sulfuric acid and 460 parts of mixed commercial xylene are charged to a glass reactor and brought to the reflux temperature of 140° C. at atmospheric pressure. Water is separated from the returning xylene stream and after 1½–2 hours the sulfonation is complete as judged by removal of the theoretical amount of water and formation of a homogeneous solution of mixed xylene sulfonic acids.

Sulfone formation is low as judged by cloud formation on dilution of a xylene-free sample with water. Assay for xylene monosulfonic acid of 179 parts is 96.5 percent of theory.

The light tan solution of xylene sulfonic acids is cooled to room temperature (25° C.) and added to a suspension of 140 parts of hexamethylenetetramine in 300 parts xylene with cooling and stirring to produce the white crystalline salts of mixed xylene sulfonic acids with hexamethylenetetramine.

The principal advantages of the process of the present invention are (1) chemical raw materials costs are low, (2) apparatus for the process is simple, (3) production yields are nearly quantitative, and (4) there are no polluting waste products. Even the aromatic hydrocarbon which adheres to the product filter cake or centrifuge cake is readily recovered, for instance by evaporation and adsorption on activated charcoal.

While certain representative embodiments and details have been shown for the purpose of illustrating the invention, it will be apparent to those skilled in this art that various changes and modifications may be made therein without departing from the spirit or scope of the invention.

What is claimed is:

1. A process of preparing an aromatic mono-sulfonic acid salt of hexamethylenetetramine comprising:
    (a) sulfonating at least one mono-cyclic aromatic hydrocarbon selected from the group consisting of toluene, ortho xylene, meta xylene and para xylene with sulfuric acid to form a solution of aromatic mono-sulfonic acid in the aromatic hydrocarbon, and
    (b) combining the solution of aromatic mono-sulfonic acid with hexamethylenetetramine to form the insoluble salt of the aromatic mono-sulfonic acid with hexamethylenetetramine, and
    (c) separating said salt from the aromatic hydrocarbon.

2. The process according to claim 1 wherein the hexamethylenetetramine is in the form of a suspension in the same aromatic hydrocarbon.

3. The process of claim 2 in which the molar ratio of the hexamethylenetetramine to the sulfonic acid is at least 1:1.

4. The process according to claim 3 wherein the molar ratio of the hexamethylenetetramine to the sulfonic acid is 1:1 to 1.2:1.

5. The process according to claim 3 wherein the molar ratio of the hexamethylenetetramine to the sulfonic acid is 1:1 to 1:1.1 and the hexamethylenetetramine and sulfonic acid are reacted at a temperature of 0° C. to 60° C.

6. The process according to claim 3 wherein the molar ratio of the hexamethylenetetramine to the sulfonic acid is 1:1 to 1:1.05 and the hexamethylenetetramine and sulfonic acid are reacted at a temperature of 25° C. to 50° C.

7. The process according to claim 6 in which the mono-cyclic aromatic hydrocarbon is toluene.

8. The process according to claim 6 in which the mono-cyclic aromatic hydrocarbon is ortho-xylene.

9. The process according to claim 6 in which the mono-cyclic aromatic hydrocarbon is meta-xylene.

10. The process according to claim 6 in which the mono-cyclic aromatic hydrocarbon is para-xylene.

11. The process according to claim 6 in which the mono-cyclic aromatic hydrocarbon is a mixture of ortho, meta and para xylenes.

12. The process of claim 1 in which the mono-cyclic aromatic hydrocarbon recovered from step (c) is returned as charge stock for subsequent sulfonation.

References Cited

UNITED STATES PATENTS

| | | | |
|---|---|---|---|
| 3,597,428 | 8/1971 | Hechenbleikner | 260—248.5 |
| 3,638,703 | 2/1972 | Endter | 260—248.5 X |

FOREIGN PATENTS

| | | |
|---|---|---|
| 160,258 | 3/1921 | Great Britain. |

JOHN M. FORD, Primary Examiner